United States Patent [19]

Nakazawa

[11] 4,189,762
[45] Feb. 19, 1980

[54] HEADLIGHT FOR MOTORIZED TWO-WHEELED VEHICLE

[75] Inventor: Yoshihiro Nakazawa, Niiza, Japan

[73] Assignee: Honda Giken Kogyo Kabushiki Kaisha, Tokyo, Japan

[21] Appl. No.: 832,428

[22] Filed: Sep. 3, 1977

[30] Foreign Application Priority Data

Sep. 16, 1976 [JP] Japan .......................... 51/123367[U]
Sep. 16, 1976 [JP] Japan .......................... 51/123368[U]

[51] Int. Cl.² .............................................. B62J 5/18
[52] U.S. Cl. ...................................... 362/72; 362/362
[58] Field of Search ................... 362/61, 72, 391, 396, 362/437, 439, 448, 308, 309, 310, 72, 80, 60, 362; 340/92

[56] References Cited

U.S. PATENT DOCUMENTS

| 1,945,198 | 1/1934 | Larson ................................. 362/308 |
| 2,482,287 | 9/1949 | Packer et al. ......................... 362/309 |

FOREIGN PATENT DOCUMENTS 512844  2/1955  Italy ......................................... 341/134

Primary Examiner—Samuel W. Engle
Assistant Examiner—Edward F. Miles
Attorney, Agent, or Firm—Hasetline, Lake & Waters

[57] ABSTRACT

A headlight assembly for a motorcycle and the like employing a reflector and a headlight casing covering the rear surface of the reflector. A supporting structure is disposed inside the casing for receiving a wiring coupler placed in a space in the casing; the supporting structure extends from the casing.

1 Claim, 5 Drawing Figures

2

HEADLIGHT FOR MOTORIZED TWO-WHEELED VEHICLE

BACKGROUND OF THE INVENTION

The present invention is directed to a headlight for a motorized two-wheeled vehicle such as a motorcycle or the like.

It has been usual hitherto with this kind of headlight that wire harnesses and wiring couplers are contained in a space formed in a headlight casing covering the rear surface of a reflector. The wire harnesses alone are fixed to the casing through bands or the like, but the wiring couplers remain unfixed after subjected to wiring, in the casing. As a result, a number of disadvantages result as: the wires thereof are liable to be entangled, that maintenance thereof become difficult and that, owing to vibrations during operation, the wiring couplers tap on the casing to generate a tapping noise.

SUMMARY OF THE INVENTION

This invention has for its object to provide a headlight free from defects of the prior art.

The principal features according to the present invention are directed to a headlight for a motorized two-wheeled vehicle, same comprising: a reflector and a headlight casing covering the rear surface of the reflector, wherein: at least one supporting member for a wiring coupler is provided in a space formed within the casing so to extend from the casing.

Also within the scope of the invention is a supporting member formed of a strip of metal separately from the casing and is attached at its base portion to the casing by means of a fastening member. Also such supporting member may be made of synthetic resin integrally formed with the casing by molding. Additionally, a plurality of such supporting members may be provided, as occasion demands, in the casing.

Other objects and advantages of the present invention will be better understood with reference to the accompanying specification, claims and drawings.

IN THE DRAWINGS

DETAILED DESCRIPTION OF THE INVENTION

Figure 1:
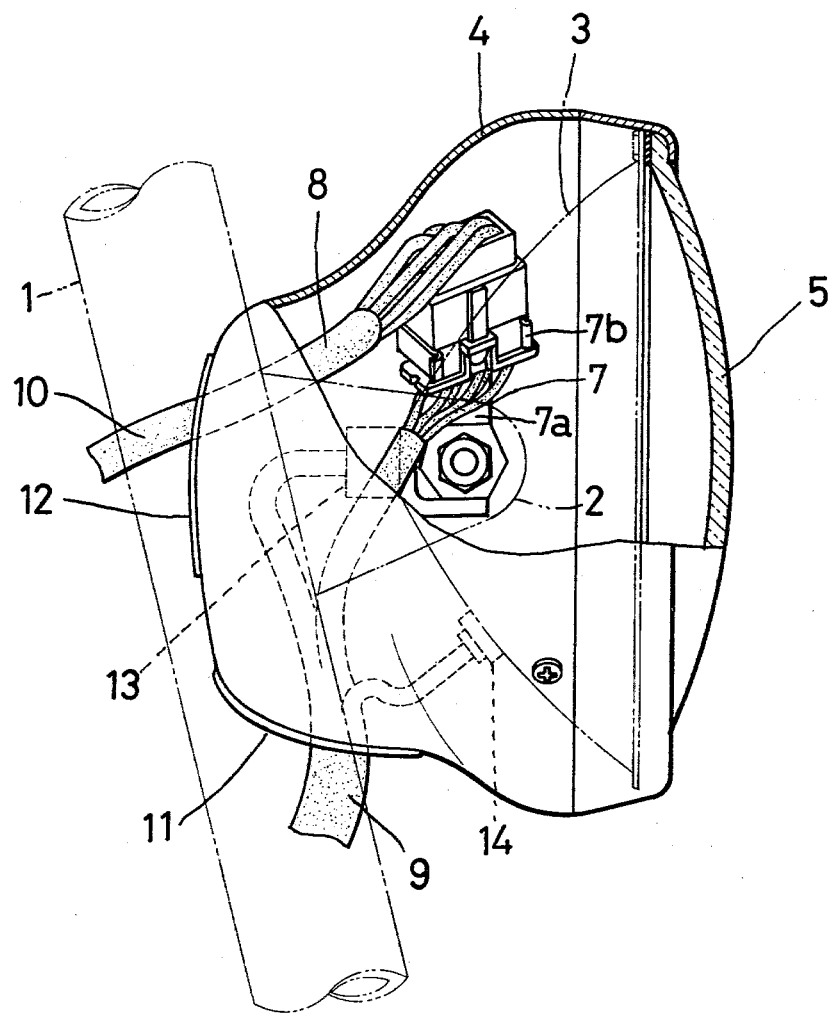
FIG. 1 is a side view, partly in section, of the present invention.
Figure 2:
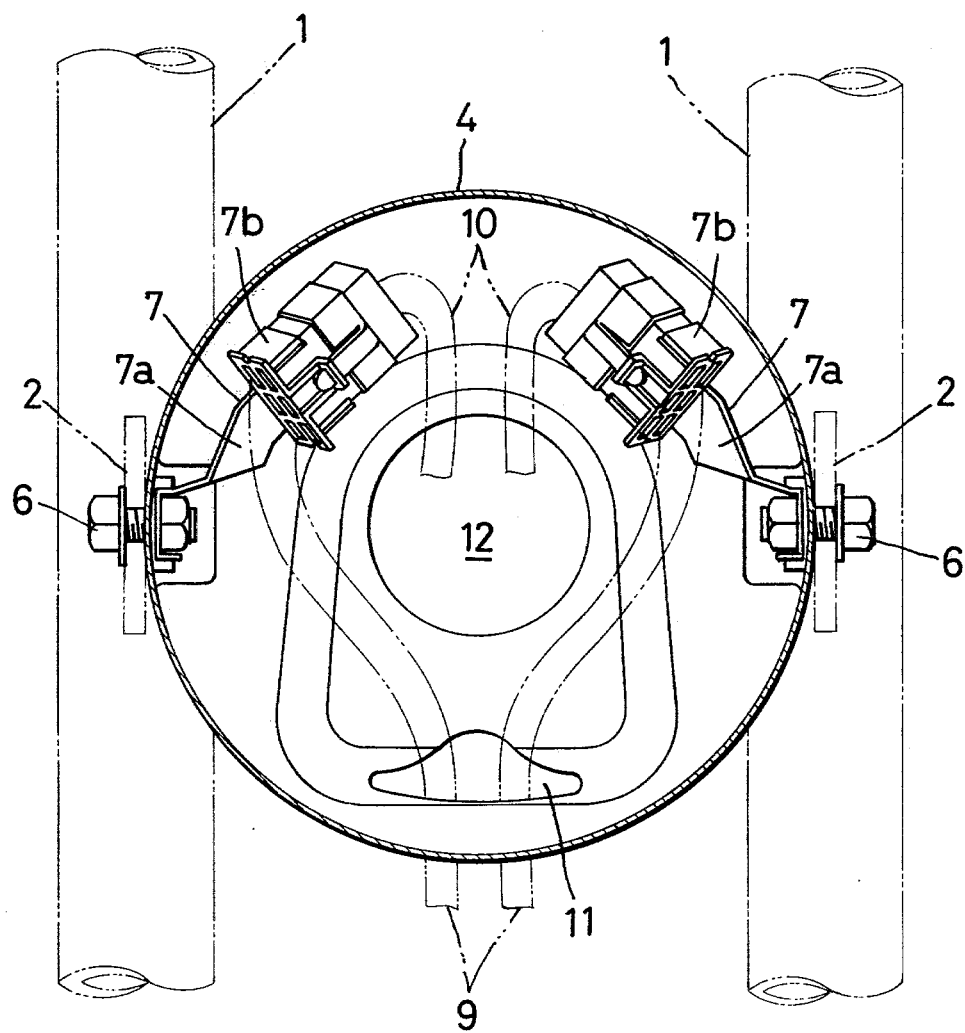
FIG. 2 is a sectional front view, partly omitted, of FIG. 1.

Accordingly, FIG. 1 denotes a front fork 1 of a motorized two-wheeled vehicle such as a motorcycle or the like, has a pair of right and left attaching brackets 2 provided thereon, and a headlight unit comprising a reflector 3, a headlight casing 4 covering the rear surface of the reflector 3 and a front lens 5 attached at the casing 4 to the attaching brackets 2 by means of fastening screws 6 (see FIG. 2). A supporting member 7 is provided in a space formed in the casing 4 as to extend from the casing 4, and the supporting member 7 serves to support a wiring coupler 8.

The wiring coupler 8 serves to interconnect an input side wire harness 9 and an output side wire harness 10, and these harnesses 9, 10 are led outside respectively through a through opening 11 made in the bottom surface of the casing 4 and a through opening 12 made in the rear surface of the same. A headlight socket 13, 14 and a position light socket are provided in the casing 4. The casing 4 is made of synthetic resin and is in the form of a bowl.

In the embodiment shown in FIGS. 1 and 2, have a pair of the supporting members 7, 7 being disposed on the right hand side and the left hand side in the casing 4. Wire harnesses 10 lead out to respective operation switches provided on right and left steering handles of the vehicle. In this case, each supporting member 7 is made of a strip of metal 7a separate from casing 4 and is then fixed at its base portion to casing 4 by means of each fastening screw 6 mentioned before. The strip of metal 7a is provided on its top end portion with a pair of resilient arms 7b, 7b so that the coupler 8 may be detachably held therebetween.

Figure 3:
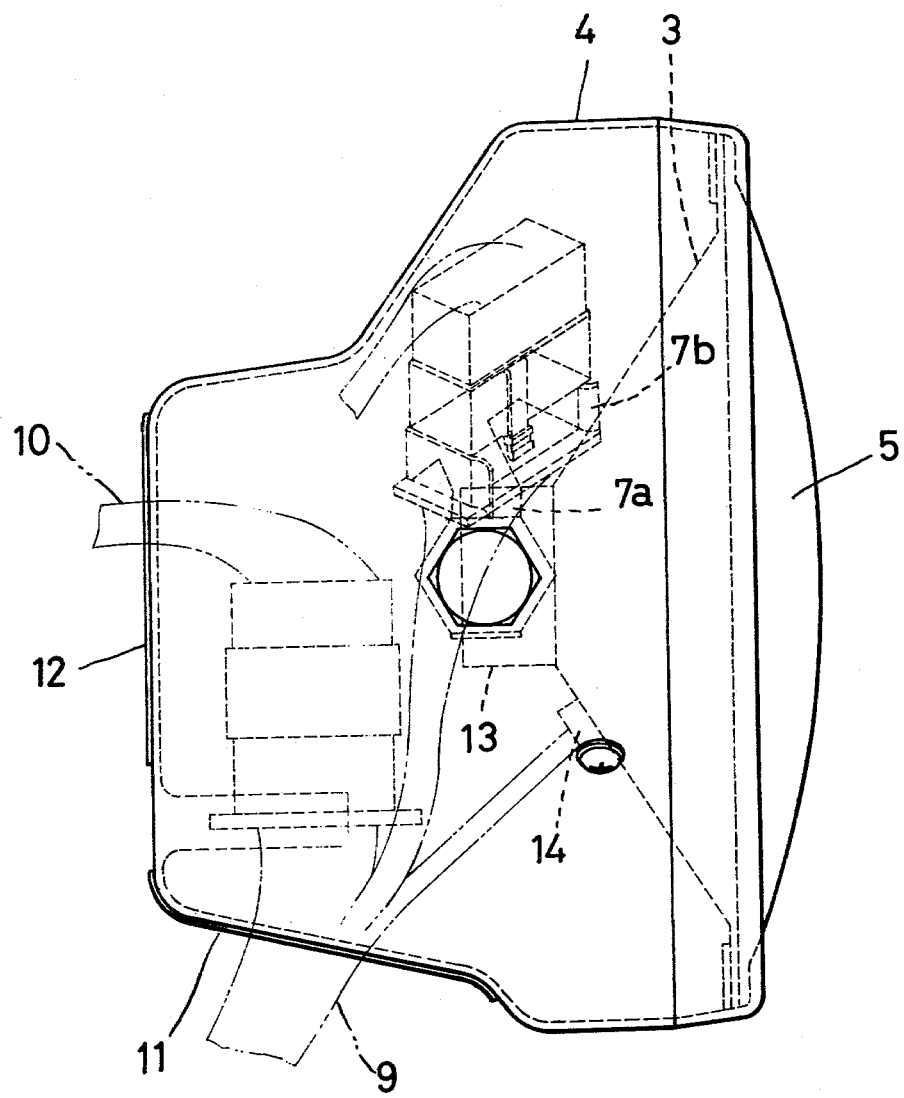
FIG. 3 is a side view of another embodiment of the invention.
Figure 4:
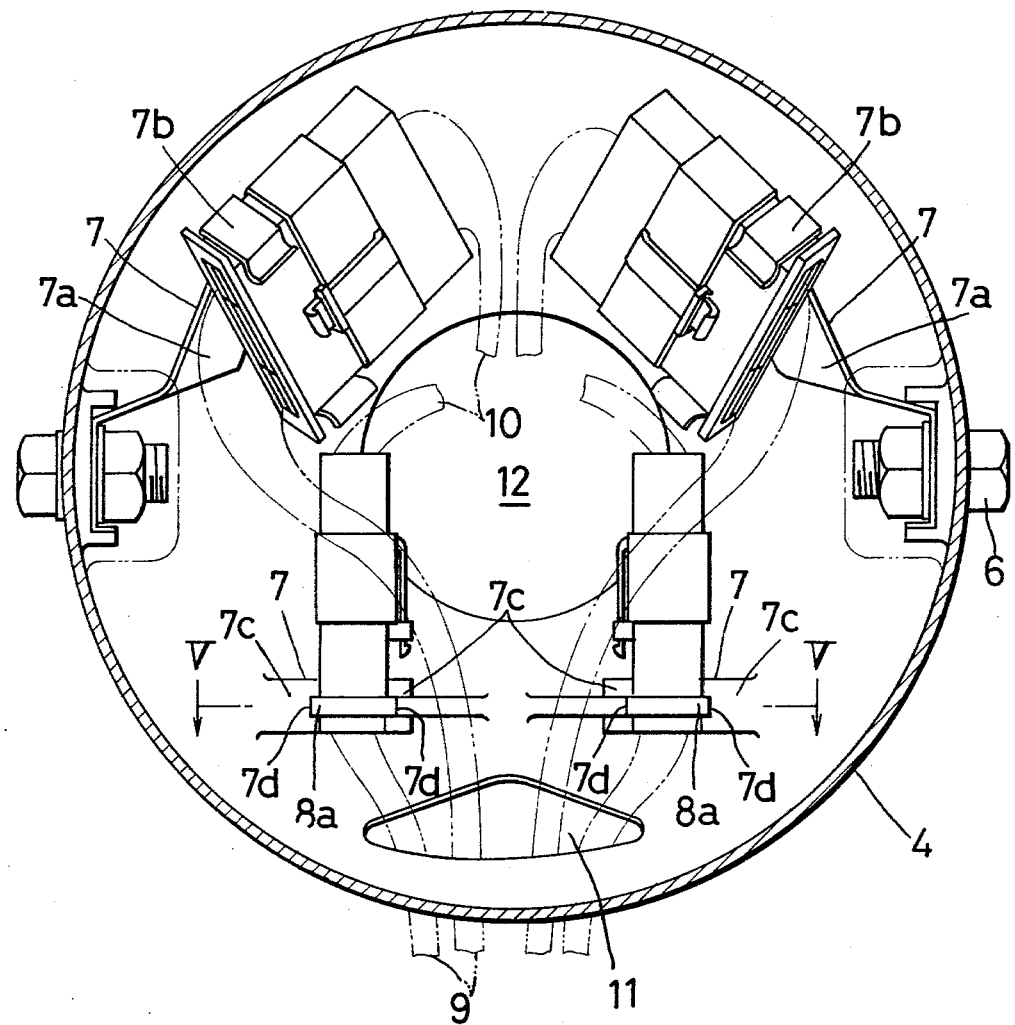
FIG. 4 is a sectional front view, partly omitted, of FIG. 3.
Figure 5:
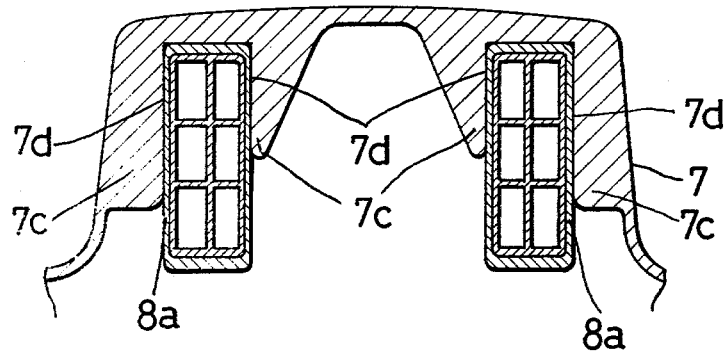
FIG. 5 is a sectional view taken along the line V—V in FIG. 4.

In a modified embodiment shown in FIGS. 3 to 5, the casing 4 is provided with a pair of the supporting members 7, 7 on the upper side and a pair of the supporting members 7, 7 on the lower side. Each of the supporting members 7, 7 on the upper side is made of a strip of metal 7a separate from the casing 4 and is attached thereto by means of a fastening screw 6 in almost the same manner as in the foregoing example, but each of the supporting members 7, 7 on the lower side is made of synthetic resin integral with the casing 4. More particularly, each supporting member 7 on the lower side comprises a pair of projecting ridges 7c, 7c integrally extending from the casing 4 and having opposite surfaces facing one another. Furthermore, the ridges 7c, 7c are formed with a pair of guide grooves 7d, 7d so that the coupler 8 may be detachably mounted, by insertion, at both sides of outer periphery flange 8a in the grooves 7d, 7d. As shown in FIG. 5, the supporting members 7, 7 on the lower side are provided in the form of a rib at an intermediate position between the through opening 11, 12 so as to reinforce that portion.

Thus, according to the present invention, the supporting member for the wiring coupler is disposed in the space formed in the headlight casing covering the rear surface of the reflector and extends from the casing. The coupler can be fixed to the casing, and thus eliminate what is common to conventional headlight assemblies where the coupler taps on the casing making noise due to vibrations or the like. Furthermore, the wiring of the headlight can be carried out in an orderly fashion and the maintenance thereof can be facilitated.

Additionally, when a pair of supporting members are provided on the right hand side and the left hand side, wire harnesses from respective operation switches on the right and left steering handles are readily coupled without crossing one another, and easy wiring can be effected. Additionally, in the case where the supporting member is made of synthetic resin integral with the casing, forming of the supporting member on the casing becomes simple and easy.

Many modifications and variations of the present invention are possible in light of the above teachings. It is, therefore, to be understood that within the scope of the appended claims, the invention may be practiced otherwise than as particularly described.

What I claim:

1. A headlight assembly for a two-wheeled motor vehicle of the type comprising: a reflector and an associated headlight casing covering the rear surface of the reflector; said casing having right- and left-hand wiring chambers; a first pair of metallic supporting members for receiving said right- and left-hand wiring chambers disposed in a space formed in an upper portion of said casing so as to extend from said casing; said first pair of supporting members in said casing are each formed of a strip of metal separately from the casing being attached at its base portion to said casing by a fastening member; a second pair of supporting means disposed at opposite sides of a lower portion of said casing and being formed integral therewith; said second pair of supporting means are formed of synthetic resinous material and having integral extending ridges with opposite surfaces facing one another; said headlight assembly being positioned between right- and left-hand front fork members; output side wire harnesses extending inwardly from said right- and left-hand wiring couplers and being connected to operation switches located on the right- and left-hand steering handles of the vehicle.

* * * * *